(No Model.)

C. R. SCHMIDT.
FAUCET.

No. 572,911. Patented Dec. 8, 1896.

Witnesses:
J. B. McGivr.
W. Darell.

Inventor.
Charles R. Schmidt
by Connoly Bros
Atty

UNITED STATES PATENT OFFICE.

CHARLES R. SCHMIDT, OF BALTIMORE, MARYLAND.

FAUCET.

SPECIFICATION forming part of Letters Patent No. 572,911, dated December 8, 1896.

Application filed July 10, 1895. Serial No. 555,541. (No model.)

*To all whom it may concern:*

Be it known that I, CHARLES R. SCHMIDT, a citizen of the United States, residing at Baltimore, in the State of Maryland, have invented certain new and useful Improvements in Faucets; and I do hereby declare the following to be a full, clear, and exact description of the invention, such as will enable others skilled in the art to which it appertains to make and use the same.

This invention has relation to cocks or faucets, and has for its object the provision of means for attaching the same securely to inclined or oblique surfaces.

The invention consists in the novel construction and combination of parts hereinafter described and claimed.

Figure 1:
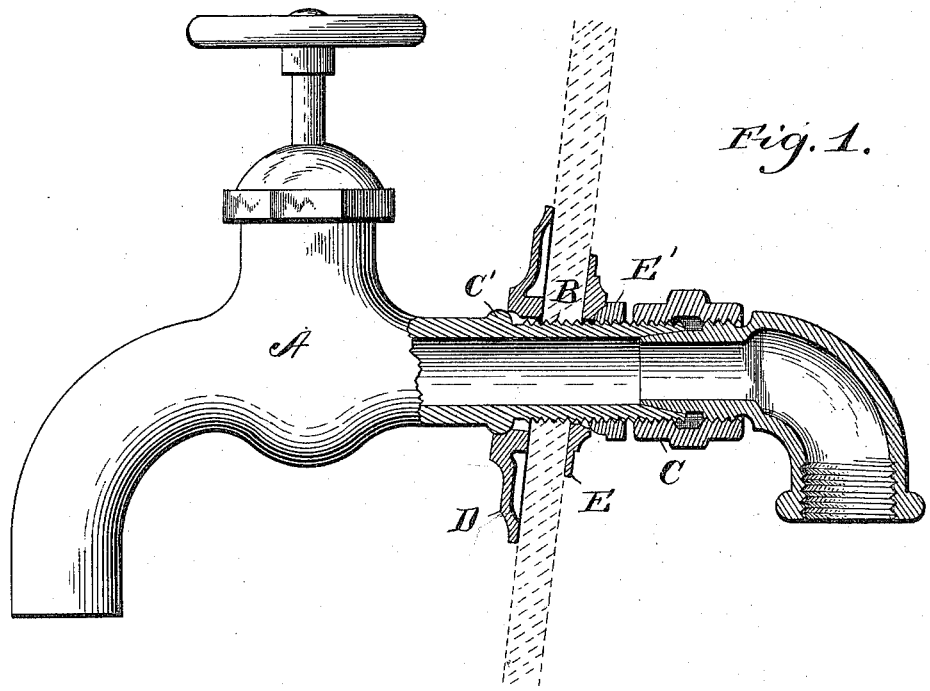
Figure 1:
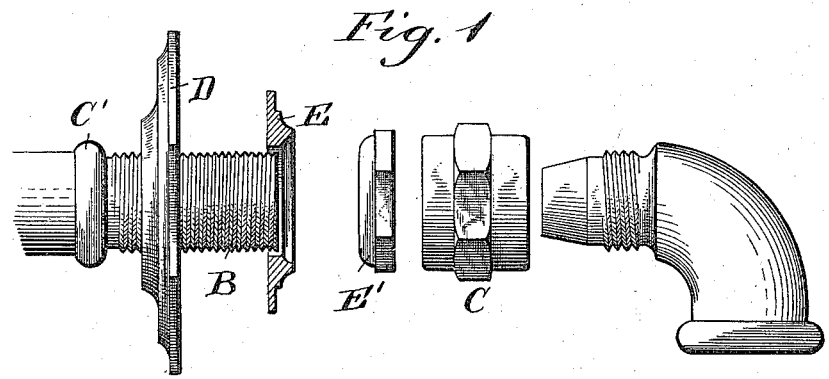

In the drawings, Figure 1 is a vertical central view of a cock or faucet attached to an inclined surface and connected to a water-supply pipe. Fig. 2 is a side elevation of the same with the connecting parts attached.

In the drawings, A designates the body of a cock or faucet having a threaded shank or stem B, which is connected to the supply-pipe by a suitable union C. At the junction of the shank and body a beveled or rounded shoulder C is formed, which when the cock or faucet is in position, with the stem or shank passing through a plate or wall having an inclined or oblique surface, abuts against a ring or flange D, having a central opening larger than the outside diameter of the shank and preferably beveled or rounded in its inner edge, so as to form a depressed seat for said shoulder.

E is a ring or flange adapted to fit over the shank B and abut against the outside of the plate or wall through which the shank passes, and also formed, like the ring D, with a central opening larger than the outside diameter of the shank and rounded or beveled.

E is a nut which screws onto the stem on shank B, outside the collar or ring E, and is formed with a rounded or convex face which seats in the opening of the ring E.

The rings D E and nut E' form, with the shoulder C, a clamp which embraces or clamps the plate or wall through which the cock or faucet projects, and by reason of the described construction of these parts they clamp equally well an oblique or inclined wall or plate, or one having one surface inclined or oblique and the other straight or perpendicular to the axis of the shank B, and thus overcome a difficulty heretofore experienced in connecting faucets or cocks to inclined or oblique walls.

Having described my invention, I claim—

1. A faucet having a rounded or beveled shoulder in combination with clamping-rings having beveled or rounded central openings of larger diameter than the outside diameter of the faucet-shank, and a nut having a rounded or convex face seating against one of said rings.

2. A faucet having a threaded shank or stem, and a rounded shoulder at the inner end of the said shank, in combination with clamping-rings loosely fitting on said shank and capable of oblique arrangement thereon, and a nut having a rounded or convex face seating against one of said rings, substantially as described.

In testimony whereof I affix my signature in presence of two witnesses.

CHARLES R. SCHMIDT.

Witnesses:
 CHAS. H. SHIPLEY,
 GEO. MCCAFFRAY.